Dec. 12, 1967 H. M. GEYER 3,357,664
TUBE SUPPORTS
Filed Oct. 14, 1965
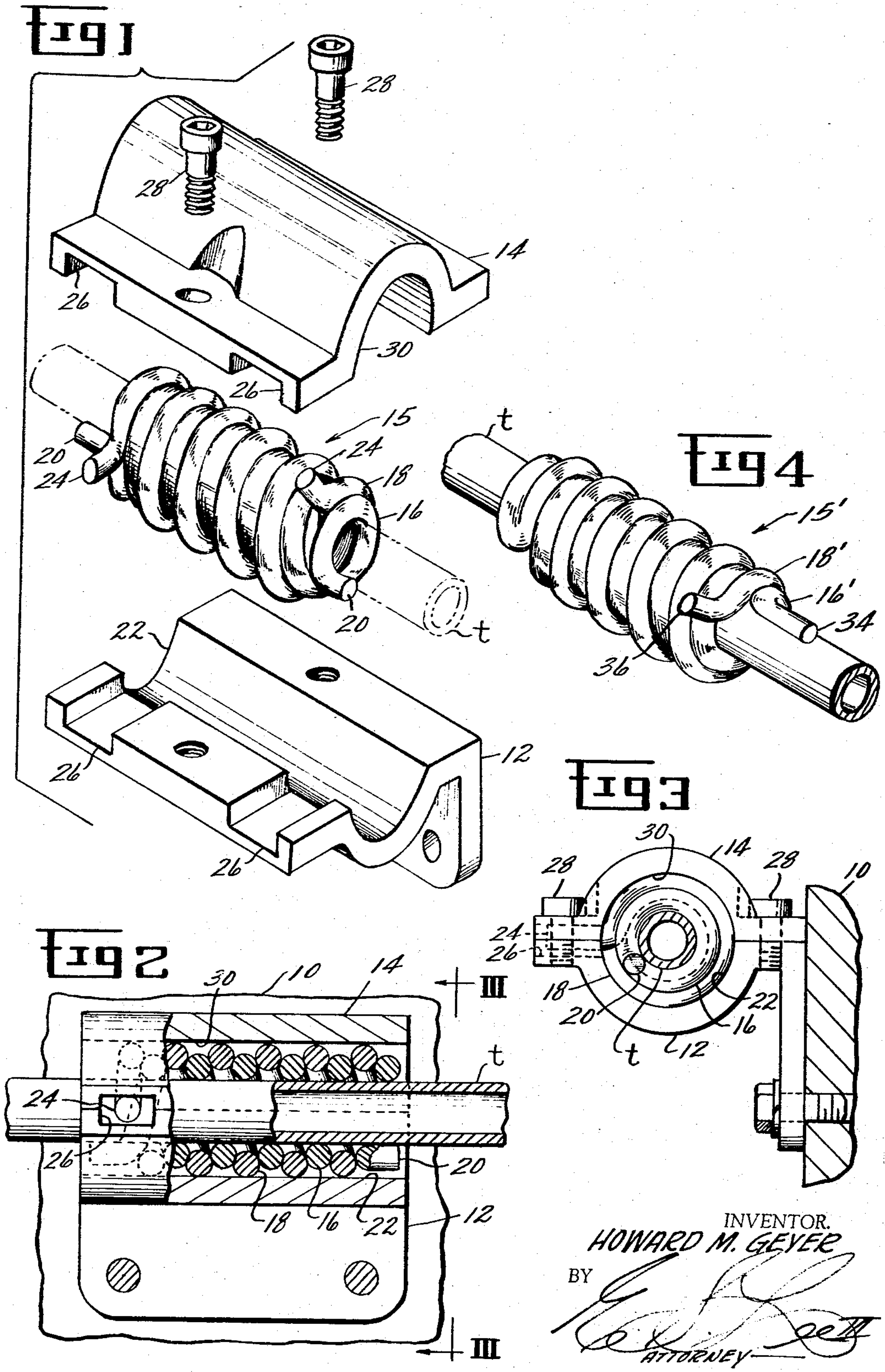
INVENTOR.
HOWARD M. GEYER
BY
ATTORNEY United States Patent Office 3,357,664

Patented Dec. 12, 1967

1

3,357,664

TUBE SUPPORTS

Howard M. Geyer, Dayton, Ohio, assignor to General Electric Company, a corporation of New York Filed Oct. 14, 1965, Ser. No. 495,872
7 Claims. (Cl. 248—74)

ABSTRACT OF THE DISCLOSURE

A pair of helical springs are threaded together and telescoped over a tube. A clamping force on the outer spring produces a substantially uniform gripping action by the inner spring on the tube to rigidly clamp it without undue stress concentration even when tube is misaligned with the clamp.

The present invention relates to improvements in tube supports.

As is well known, it is frequently necessary that tubes carrying fuel, water, other liquids and gases must extend substantial distances in various installations. Frequently the length, and more particularly the span, of the tube is such that it must be supported intermediate its length, otherwise the tube would become overstressed and eventually a failure could occur. In stationary structures a simple underlying bracket will usually suffice for such purposes. However, in other installations, such as fuel lines for a large engine, vibration conditions exist which require not only a very firm clamping action on the tube, but extreme care to avoid undue stress concentrations which could cause a premature failure of the tube. The same problems are encountered where tubes must be mounted on machines which change their orientation to any appreciable extent.

Actually a solid clamp for the tube provides an effective supporting means for such installations where a simple bracket will not suffice. Unfortunately in practical manufacturing operations it is impossible to assure sufficiently accurate alignment of a tube with a solid support, without providing universal adjustment means for the support, in most instances. Further stresses and differential expansion caused by temperature would result in a solid clamp introducing undue stress concentrations. The more conventional use of a rubber sleeve or the like to accommodate such misalignment in a solid clamp cannot be tolerated in many high ambient operating conditions.

One recent proposal for a solid clamp which can tolerate such misalignment has been to interpose steel wool between the tube and the clamping surfaces. The steel wool adjusts itself to any misalignment so that a uniform clamping action is attained on the portion of the tube being supported. This is highly effective up to a point, but under extended periods of vibration, the steel wool becomes overcompressed and the clamping action on the tube becomes ineffective.

The object of the present invention is therefore to provide an improved tube support, especially capable of high temperature use, which exerts a substantially uniform clamping force on the tube over a substantial length thereof without introducing any undue stress concentration and can tolerate the normal misalignment of tube and support means which are encountered in practical manufacturing operations, while still providing a uniform, stress concentration-free clamping action.

These ends are attained by a tube support broadly characterized in the provision of a spring assembly which is to be telescoped over the tube to be supported. This spring assembly comprises an inner spring portion extending along a substantial length of the tube. This inner spring portion is preferably intercoiled with an outer spring portion and means are provided for exerting a clamping force

2 on the outer spring portion sufficient to displace it and thus resiliently elongate the inner spring portion an amount sufficient for the helical length thereof to grip the tube.

The above and other related objects and the more specific features of the invention will be apparent from a reading of the following description of the disclosure found in the accompanying drawing and the novelty thereof pointed out in the appended claims.

In the drawing:

FIGURE 1 is an exploded view, in perspective, of a tube support embodying the present invention;

FIGURE 2 is an elevation, partly in section, showing this spring support in its assembled condition;

FIGURE 3 is a section taken on line III—III in FIGURE 2; and

FIGURE 4 is a perspective view of an alternate embodiment of a spring assembly seen in FIGURE 1.

The present mount is disclosed in a preferred embodiment useful in supporting a tube *t*, intermediate its length, on a fragmentarily shown housing 10 (FIGURE 3). The components of the mount may be quickly identified as a bracket 12, a cap 14, and a spring assembly 15.

The spring assembly 15 comprises a pair of helically wound springs 16 and 18 which are of the same hand and nested by being threaded together. The springs 16 and 18 are preferably of approximately the same wire diameter and, when threaded together, are mutually elongated. Further, the inner diameter of the inner spring 16 approximates or is slightly less than the outer diameter of the tube *t* which is to be supported, and the inner diameter of the spring 18 is always greater than the outer diameter of this tube. The dimensional and physical properties of the springs 16 and 18 and more particularly the critical limitations thereof will later be described in greater detail in explaining the clamping action on the tube *t*.

The most convenient practice is to first thread the springs 16 and 18 together and then telescope this assembly over the tube *t*. As was indicated above, it is desirable that the inner diameter of this assembly actually be somewhat less than the outer diameter of the tube. Thus to facilitate the telescoping of the assembly over the tube, the ends of the spring 16 are turned outwardly in an axial direction forming prongs 20 to which a torque may be applied, thereby expanding the inner diameter of the assembly 15 and facilitating its being telescoped over the tube *t* to a desired point intermediate its length.

When the nested spring assembly 15 is properly positioned on the tube *t*, it overlies a seat 22 formed in the bracket 12. At this point it will be noted that bolts 30 have already been employed in securing the bracket 12 in a fixed position on the housing 10. Prongs 24 are provided by radially outbent ends of the outer spring 18 and are registerable with slots 26 compositely formed by the bracket 12 and the cap 14. The latter is attached to the bracket 12 by screws 28 and is provided with a cooperating seat 30 which in cooperation with the seat 22 firmly clamps the spring assembly 15 in place. More particularly the dimensions of the seats 22 and 30 form an effective diameter somewhat less than the outer diameter of the spring 18 so that when the cap 14 is firmly clamped in place, the spring 18 is reduced in diameter to thereby apply a resilient force which is effective on the spring 16 to cause its elongation and torsional deflection so that a gripping force is thus effective on the tube *t* to firmly hold it in place.

With the prongs 24 captured in the slots 26 the spring assembly 15 is positively held in place axially of the tube *t*. The prongs 24 float to some extent in the slots 26, however, so as to accommodate elongation of the spring 18 when it is clamped by the cap 14. It will also be noted that the prongs 22 are preferably angularly offset to provide an initial torquing force on the spring 18, tending to increase the gripping force of the spring assembly, as the cap 14 is secured to the bracket 12 and the prongs 22 are brought into a common plane.

While certain preferred relationships in the sizes and properties of the springs 16 and 18 were related above, the really essential features of the invention are that once the nested springs 16 and 18 are clamped, there be no direct contact between the spring 18 and the tube *t*. That is, the spring force exerted on the tube *t* is always a result of having been transferred through at least two interwound spring coils or coil portions as will be apparent from FIGURE 2.

FIGURE 4 illustrates an alternate spring assembly 15' in which inner and outer coil spring portions 16' and 18' are formed by a single length of wire which is reversely folded after the requisite number of coils have formed on the inner portion 16' to then form the coils of the outer portion 18'.

A single prong 34 extends axially outwardly of the inner coil portion 16' and a single prong 36 extends radially outwardly of the outer coil portion 18'. Since the opposite ends of the two coil portions are effectively joined by their integral construction, the prongs 34 and 36 may be more conveniently gripped to apply a torquing force thereto which will expand the spring assembly and facilitate its being telescoped over the tube *t*.

The spring assembly 15' is functionally equivalent to the described assembly 15 and is clamped between the bracket 12 and cap 14 in the same manner to provide a yielding clamping force or gripping force on the tube *t* to support it intermediate its length.

In connection with the prongs 20 and 24 or 34 and 36 it will be noted that the prongs 20 and 34 extend axially whereas the prongs 24 and 36 extend radially outwardly. This not only facilitates nesting of the two separate springs 16 and 18 but is of convenience in permitting the prongs 24 or 36 to be employed as means positively locating the spring assembly lengthwise of the tube *t*, the prongs 20 or 34 thus having clearance with respect to the mounting bracket 12 and/or cap 14.

The gripping force provided by either of the spring assemblies 15 or 15' is essentially the same in that a resilient gripping force is provided substantially throughout the length of the inner spring or spring portion along a helical path encompassing the tube *t*. By having this assured elongating gripping surface (even though it is theoretically line contact) the stress concentrations at any one point are greatly minimized in obtaining sufficient clamping force to effectively prevent or minimize vibration or the like as adequate support is given to the tube. In practical installations it is almost inevitable that there shall be some angular misalignment (in any plane) between the tube and the support bracket. This misalignment can be tolerated by the present support since the coil portions on one side of the tube will be spread further apart than on the other to automatically adjust to the misalignment condition and evenly distributes the gripping force without introduction of stress concentrations which might cause a premature failure. This emphasizes that the elongating force on the inner spring is transmitted by the coil-to-coil contact with the outer spring through a high friction. This high friction force is further effective in damping vibrations which may be induced in the tube by fluid pulsations or external excitation. The resilient mount also accommodates a relative shifting between the tube and brackets that may result from stress or differential expansion caused by temperature changes.

It is contemplated that variations in the specific, preferred structure herein disclosed, such as using helical coil springs of other than circular cross section wire, will occur to those skilled in the art, and the scope of the present invention is therefore to be derived solely from the following claims.

Having thus described the invention, what is claimed as novel and desired to be secured by Letters Patent of the United States is:

1. A tube support comprising
a helical spring to be telescoped over a tube as if helically wound thereabout, and
means clamping said spring relative to said tube and exerting an elongating force thereon causing the spring to firmly grip the tube substantially throughout a substantial helical length of the spring, said clamping means supporting the tube and spring at least at the extremities of the gripped length.

2. A tube support comprising
a spring assembly to be telescoped over a tube,
said spring assembly comprising inner and outer, intercoiled helical spring portions which are to be disposed as if helically wound about the tube when telescoped thereover,
and rigid supporting means for exerting a force on the outer spring portion, displacing it relative to the inner spring portion and resiliently elongating the inner spring portion an amount sufficient to firmly grip the tube substantially throughout the helical length of the inner spring portion to thus support the tube.

3. A tube support as in claim 2 wherein the spring assembly comprises a pair of helical springs threaded together.

4. A tube support as in claim 2 wherein the spring assembly is formed from a single length of wire.

5. A tube support as in claim 2 wherein
the means for exerting a force on the outer spring comprises bracket means including a bracket for attachment to a housing or the like and a clamp which are assembled together to bear against the outer spring,
said outer spring portion having an outwardly bent prong received by a slot in said bracket means to positively locate the spring assembly relative thereto.

6. A tube support as in claim 5 wherein the spring assembly comprises a pair of helical springs threaded together,
the outer spring having at its opposite ends prongs extending radially outwardly and angularly offset one from the other and further wherein the bracket means has a pair of slots spaced apart approximately the distance between said prongs and adapted to receive same whereby when the cap is assembled on the bracket, an initial torquing force is applied to the outer spring tending to tighten the spring assembly on the tube.

7. A tube support as in claim 2 wherein the inner diameter of the inner spring portion is slightly less than the outer diameter of the tube and the spring assembly has prongs extending thereto for the manual exertion of a torque force tending to expand the spring assembly and facilitate its being telescoped over the tube.

References Cited

UNITED STATES PATENTS

| | | | |
|---|---|---|---|
| 2,086,321 | 7/1937 | Kudo. | |
| 2,459,012 | 1/1949 | Barth. | |
| 3,041,025 | 6/1962 | Daly | 248—74 |

ROY D. FRAZIER, *Primary Examiner.*

J. F. FOSS, *Assistant Examiner.*